United States Patent [19]  
Kuzma

[11] 4,145,319  
[45] Mar. 20, 1979

[54] PROCESS FOR PREPARING WATER-SOLUBLE ALKYDS MODIFIED WITH MULTIFUNCTIONAL MONOMERS

[75] Inventor: Edward J. Kuzma, Woodbridge, N.J.

[73] Assignee: Celanese Corporation, New York, N.Y.

[21] Appl. No.: 856,377

[22] Filed: Dec. 1, 1977

[51] Int. Cl.$^2$ .......................... C09D 3/64; C09D 3/66; C09D 3/68; C09D 5/02
[52] U.S. Cl. .......................... 260/22 CB; 260/22 M; 260/29.2 E; 260/31.2 R; 260/31.2 XA
[58] Field of Search ............ 260/22 CB, 22 T, 22 M, 260/29.2 E, 31.2 R, 31.2 XA

[56] References Cited

U.S. PATENT DOCUMENTS

| | | | |
|---|---|---|---|
| 2,850,469 | 9/1958 | Christenson | 260/22 CB |
| 2,860,114 | 11/1958 | Bolton et al. | 260/22 T |
| 3,380,942 | 4/1968 | Menke | 260/22 T |
| 3,392,129 | 7/1968 | Hoy et al. | 260/22 T |
| 3,487,034 | 12/1969 | Mallios | 260/22 M |
| 3,957,711 | 5/1976 | Powanda et al. | 260/29.6 H |
| 4,010,126 | 3/1977 | Kuzma | 260/22 CB |
| 4,072,642 | 2/1978 | Ritz et al. | 260/22 CB |

Primary Examiner—Ronald W. Griffin  
Attorney, Agent, or Firm—Linn I. Grim

[57] ABSTRACT

Improved water-reducible alkyd resins are made by incorporating α,β-ethylenically unsaturated acid esters of polyols into the final resin product.

9 Claims, No Drawings

PROCESS FOR PREPARING WATER-SOLUBLE ALKYDS MODIFIED WITH MULTIFUNCTIONAL MONOMERS

This invention relates to a method of preparing improved water-reducible alkyd resins, and products produced thereby.

Alkyd resins are the products obtained by condensation of polybasic, i.e. polycarboxylic, acids with polyols, e.g. phthalic acid and glycerol. Modified alkyd resins are prepared from modified polyols, i.e. the polyols are partially esterified with monobasic acids such as the fatty acids derived from naturally-occurring glycerides before reaction with the polybasic acid. The partial esters are prepared in several different procedures, e.g. alcoholysis of glycerides or direct esterification of polyols. For example, natural triglyceride oils such as soya bean oil are reacted with a polyol to effect alcoholysis of the triglyceride, usually until substantially no further triglyceride is present. The resulting mixture is comprised of partial esters of glycerol and the added polyol. Suitable partial esters of polyols may also be prepared by reaction of monocarboxylic acids with various polyols, e.g. hexanediol, pentaerythritol, glycerol, trimethylolpropane and the like. The monobasic acids in general use are derived from naturally occurring oils such as soya bean oil and linseed oil, and include oleic and linoleic acids. Shorter chainlength comparable acids are also used.

To render the so-produced alkyd resin water-reducible, the resin is then reacted with a polycarboxylic acid, commonly trimellitic acid, which provides free carboxyl groups in the resin. By neutralization of the so-introduced carboxyl groups with suitable bases, the resin is rendered water-reducible in that the resin can be formulated with water for production of water-based alkyd resin coating compositions.

It has now been found that incorporation of certain multifunctional polyol derivatives into the water-reducible alkyd resins improves the properties of the resins, particularly in film-forming compositions, e.g. paints, as evidenced by rapid drying in short time periods and significant improvement in hardness, gloss and drying times of enamels prepared therewith. It has also been discovered that the addition of the multifunctional polyol derivatives to the reaction can be critical in that, when added to the initial alkyd resin reaction mixture, it may lead to gelling of the reaction mixture, or increasing the viscosity of the alkyd resin which adds considerable difficulty in the second stage reaction to impart water solubility. It has been found that addition of the multifunctional polyol just prior to if not simultaneous with the trimellitic acid addition substantially obviates the aforesaid difficulties and permits the reaction to proceed to desired acid numbers (as a measure of free carboxyl groups) and desired high, but workable, viscosities of the final product.

The multifunctional polyol derivatives of the present invention are $\alpha,\beta$-ethylenically unsaturated carboxylic acid esters of polyols, the polyols containing at least two hydroxy groups. Exemplary of such acids are acrylic, methacrylic and homologous acids thereof, and the polyols include, for example, ethylene glycol; diethylene glycol; glycerol; 1,3-propanediol; 1,3-butanediol; 1,3,4-butanetriol; 1,4-cyclohexanediol; 1,4-benzenediol; pentaerythritol; dipentaerythritol; tripentaerythritol; trimethylolpropane; trimethylolethane; sorbitol; 1,5-pentanediol; hexanediol; polyethylene glycols (Mol. wt. = 200–1500) and the like. The said polyols are also suitable for the aforesaid preparations of the polyol partial ester starting materials.

The polycarboxylic acid employed in rendering the alkyd resin water-reducible is conveniently trimellitic acid, although various equivalent acids can also be used.

The acid employed in forming the initial alkyd resin is usually phthalic or isophthalic acid, although various equivalent acids can be used, e.g. adipic, succinic, pimelic, and other such dibasic acids. Usually, unsaturated dibasic acids such as maleic and fumaric acid are avoided since their use can lead to gelation of the alkyd resin preparation mixture.

A variety of oils are suitable for the alcoholysis preparation of the partial esters as is known to the art. The most common are, for example, soya bean oil and linseed oil. Any liquid triglyceride, of course, can be employed but the preferred are usually the naturally occurring liquid triglycerides exemplified by soya bean and linseed oils. These same oils can be used as the source of the monobasic acids employed in partial esterification of polyols to form polyol partial ester starting materials.

DESCRIPTION OF PREFERRED EMBODIMENTS

The preferred multifunctional polyol derivatives are acrylic acid or methacrylic acid esters of the selected polyol in which at least two hydroxy groups are esterified. Exemplary preferred compounds include: ethylene glycol diacrylate diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra- acrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, 1,3-propanediol diacrylate, 1,5-pentanediol dimethacrylate, hexanediol diacrylate, the bisacrylates and methacrylates of polyethylene glycols of a molecular weight of 200–1500, and the like.

The multifunctional polyol derivatives can be employed at any level to attain the desired result. As little as 0.5% by weight based on the weight of the reaction mixture will provide some beneficial results. Generally, from about 1% to about 10% can be employed for most compositions, although larger amounts can be employed. However, when high levels of the derivative are used, care should be taken to avoid gelation of the reaction mixture. A minimum of experimentation will dictate the optimum effective levels of the polyol derivative in any particular alkyd resin preparation and is within the skill of the art. As is evident, the level at which gelation will occur is dependent upon the number of unsaturated acrylic groups contained in the polyol derivative, as well as the process conditions employed.

For convenience, the initial alkyd resin is prepared in batchwise fashion by condensing the selected polyol with the monocarboxylic acid and polycarboxylic acid in a single reactor. The mixture of starting materials is heated at elevated temperature until the acid number is about 10, and preferably less than 10. Usually, reaction temperatures between about 180 and about 250° C. for time periods of from about 6 to about 12 hours are sufficient. Since water is evolved, the course of the reaction can be monitored by trapping the water evolved. As can be expected, the reaction temperature and time required for any specific mixture will vary depending upon the starting materials. Of course, when low reaction temperature is employed, the time of reaction will be longer than with higher reaction temperature.

After the initial alkyd resin formation is complete, trimellitic acid, preferably in the form of the anhydride, and the multifunctional polyol derivative are added to the mixture and the mixture heated to form the final product. The heating is continued until the acid number of the resin is about 50-60 and preferably until the viscosity is at least at a value of "T" on the Gardner scale. The reaction is also conveniently monitored by measuring the water formed during the course of the reaction. When alkyd resin formation starts, water is given off and continues until the reaction is complete. Thus, the reaction mixture is heated to a temperature where water evolution commences and the reaction is followed by merely collecting the water in a suitable trap. Heating is continued until the acid number (solids) reaches the desired value. For most such reactions, temperatures between about 180° and 220° C. are adequate to provide substantially complete reaction in time periods of from about one to several hours.

The amount of trimellitic anhydride employed in the alkyd resin formation is that normally employed in preparing such products. Generally, at least about 5% by weight based on the total reaction mixture is employed. Usually, about 10% by weight of anhydride is found to produce desired results.

The multifunctional polyol derivative can be added before the anhydride, simultaneous with or even after the anhydride addition. Preferably, the polyol derivative and anhydride are added substantially simultaneously.

The exact mechanism by which the present invention functions is not known, particularly in view of the complexity of the alkyd resin system employed. Apparently, the multifunctional compound is incorporated into the complex structure of the alkyd resin. Regardless of the mechanism, the present invention provides significant improvements in alkyd resin production by incorporation of the present multifunctional polyol derivatives into the final product, the improvements residing in better color characteristics of the alkyd resin product and rapid drying time and improved hardness for coatings prepared therefrom. Films formed with the present new alkyd resins also demonstrate improved resistance to water spotting as well as significantly higher gloss retention on weather exposure.

The final alkyd resin product is made water-reducible by neutralizing with suitable bases to a neutral pH and preferably to slightly alkaline pH. Such neutralization, of course, can be accomplished by the art-recognized procedures commonly used for this purpose. For example, the resin can be treated with ammonium hydroxide, sodium hydroxide, amines, such as triethanolamine and the like.

The neutralized alkyd resin products can be formulated into coating compositions by dilution to any desired solids concentration in water which may contain co-solvents such as glycols and glycol ethers such as monoalkyl ethers of ethylene glycol. There can be added the usual adjuvants such as pigments, e.g. titanium dioxide, aminoplast curing agents, e.g. melamine and urea formaldehyde resins, and drying agents, e.g. cobalt and lead naphthenates or octoates.

When formulated for coating applications, the present new alkyd resins form coatings which set to touch in usually less than 10 minutes and tack-free cure in less than one hour. The fims are of significantly higher hardness than control films.

The following examples further illustrate the invention.

EXAMPLE 1

Alkyd resins are prepared in accordance with the following procedures with results tabulated in Table I.

Procedure A

1. Soya fatty acid, trimethylolpropane, isophthalic acid and trimethylolpropane triacrylate are charged into a three neck flask, heated under nitrogen sparge and reacted to an acid number of less than ten.
2. The contents of the flask are cooled to 180° C. and trimellitic anhydride is added. Heat to 190°-200° C. and react to an acid number of 50-60.
3. The resin is cooled to 100° C. and diluted to 50% solids with an 80/20 water/Glycocel * EB solution.
4. Neutralize to a pH of 7 to 8.5 with NH$_4$OH. * Glycocel is a registered trademark (Celanese Corporation) Glycocel EB = monobutyl ether of ethylene glycol.

Procedure B

1. Soya fatty acid, trimethylolpropane and isophthalic acid are charged into a three neck flask, heated under nitrogen sparge and reacted to an acid number of less than ten.
2. The contents of the flask are cooled to 180° C. and trimethylolpropane triacrylate and trimellitic anhydride are added. Heat to 190°-200° C. and react to an acid number of 50-60.
3. The resin is cooled to 100° C. and diluted to 50% solids with an 80/20 water/Glycocel * EB solution.
4. Neutralize to a pH of 7 to 8.5 with NH$_4$OH.

TABLE I

| WATER SOLUBLE ALKYDS MODIFIED WITH MULTIFUNCTIONAL MONOMERS | | | | | | | | | |
|---|---|---|---|---|---|---|---|---|---|
| | SAMPLE NO. | | | | | | | | |
| Components (Weight %) | 1 | 2 | 3 | 4 | 5 | 6 | 7 | 8 | 9 |
| Soya Fatty Acids | 357 | 357 | 357 | 357 | 357 | 357 | 357 | 357 | 357 |
| Trimethylolpropane | 335 | 335 | 335 | 335 | 335 | 334.99 | 334.99 | 334.99 | 334.99 |
| 1,6-Hexanediol | — | — | — | — | — | — | — | — | — |
| Pentaerythritol (mono) | — | — | — | — | — | — | — | — | — |
| Ethylene Glycol | — | — | — | — | — | — | — | — | — |
| Isophthalic Acid | 299 | 299 | 299 | 299 | 299 | 149.40 | 149.40 | 149.40 | — |
| Adipic Acid | — | — | — | — | — | 131.40 | 131.40 | 131.40 | — |
| Phthalic Anydride | — | — | — | — | — | — | — | — | 266.40 |
| Trimellitic Anhydride | 99 | 99 | 99 | 99 | 99 | 98.99 | 98.99 | 98.99 | 98.99 |
| Trimethylolpropane Triacrylate | 55 | 22 | 22 | 55 | — | 53.58 | — | 21.43 | — |

TABLE I-continued
WATER SOLUBLE ALKYDS MODIFIED WITH MULTIFUNCTIONAL MONOMERS

| | | | | | | | | |
|---|---|---|---|---|---|---|---|---|
| Procedure Used | A | B | A | B | — | B | — | B | — |
| Viscosity at 50% in 80/20 Water/Glycocel EB | Gelled | Z-2 | Z-6+ | Z-4 | Z-3 | X-¾ | Z-2 | Y-½ | Z-2 |

| | SAMPLE NO. | | | | | | | |
|---|---|---|---|---|---|---|---|---|
| COMPONENTS (Weight %) | 10 | 11 | 12 | 13 | 14 | 15 | 16 | 17 | 18 |
| Soya Fatty Acids | 357 | 357 | 357 | 357 | 357 | 357 | 357 | 357 | 357 |
| Trimethylolpropane | 334.99 | 334.99 | — | — | — | — | — | — | 334.99 |
| 1,6-Hexanediol | — | — | 442.56 | 442.56 | 442.56 | — | — | — | — |
| Pentaerythritol (mono) | — | — | — | — | — | 127.51 | 127.51 | 127.51 | — |
| Ethylene Glycol | — | — | — | — | — | 116.26 | 116.26 | 116.26 | — |
| Isophthalic Acid | — | — | 298.80 | 298.80 | 298.80 | 298.80 | 298.80 | 298.80 | — |
| Adipic Acid | — | — | — | — | — | — | — | — | — |
| Phthalic Anhydride | 266.40 | 266.40 | — | — | — | — | — | — | 266.40 |
| Trimellitic Anhydride | 98.99 | 98.99 | 98.99 | 98.99 | 98.99 | 98.99 | 98.99 | 98.99 | — |
| Trimethylolpropane Triacrylate | 21.45 | 52.87 | — | 23.95 | 59.87 | — | 19.97 | 44.98 | — |
| Procedure Used | B | B | — | B | B | — | B | B | Control |
| Viscosity at 50% in 80/20 Water/Glycocel EB | Z | Z-1 | — | — | — | Z-1 | Z-1 | Y | — |

EXAMPLE 2

White gloss paint formulations are prepared as follows:

A TiO$_2$ paste is made up by thoroughly mixing:

| | Weight |
|---|---|
| TiO$_2$ | 60 |
| Alkyd, 50% in 80/20 water/Glycocel EB | 40 |
| | 100 | and grinding on a 3-roll mill to a 7–5 fineness. The enamel is prepared by mixing the following:

| | Weight |
|---|---|
| TiO$_2$ Paste | 40.0 |
| Alkyd, 50% in 80/20 water/Glycocel EB | 56.0 |
| Water | 3.1 |
| Manganese salt (6% available manganese) | 0.3 |
| Cobalt salt (6% available cobalt) | 0.6 |
| | 100.0 |

Pigment/Resin = 24/36 in the enamel formulation. The manganese is present at 0.05% metal based on resin solids, and cobalt at 0.1%.

The alkyd resins prepared in Example 1 are formulated into white gloss paint formulations in accordance with the foregoing and tested. The results are given in Table II.

TABLE II

| | SAMPLE NO. | | | | | | | |
|---|---|---|---|---|---|---|---|---|
| PHYSICAL PROPERTIES | 2 | 3 | 4 | 5 | 6 | 7 | 8 | 9 |
| Set to Touch (Minutes) | 7 | 8 | 7 | 8 | 7 | 8 | 7 | 8 |
| Tack-Free Cure Before Testing | 43 min. | 39 min. | 34 min. | 45 min. | Overnight | Overnight | Overnight | 1 hr, 44 min. |
| Tukon Hardness | | | | | | | | |
| 1 day | 2.7 | 2.8 | 3.0 | 2.1 | 1.7 | 1.4 | 1.5 | 1.2 |
| 3 days | 5.3 | 5.6 | 8.0 | 3.4 | 2.9 | 2.1 | 2.8 | 4.7 |
| 5 days | 6.6 | 7.2 | 9.6 | 5.2 | 2.8 | 2.1 | 2.7 | 5.1 |
| 7 days | 9.1 | 9.1 | 11.4 | 7.5 | 3.1 | 2.2 | 2.9 | 6.1 |
| Cross Hatch Adhesion (Pass) | 100% | 100% | 100% | 100% | 100% | 100% | 100% | 100% |
| Conical Mandrel | Passed | Passed | Passed | Passed | Passed | Passed | Passed | Passed |
| Reverse Impact (Pass/Fail) | 0/4 | 0/4 | 0/4 | 0/4 | 144/148 | 156/160 | 144/148 | 16/20 |
| Gloss (60%) | 94.8 | 95.2 | 96.8 | 93.8 | 86.4 | 85.0 | 89.0 | 95.0 |

| PHYSICAL PROPERTIES | 10 | 11 | 12 | 13 | 14 | 15 | 16 | 17 | 18 |
|---|---|---|---|---|---|---|---|---|---|
| Set to Touch (Minutes) | 6 | 7 | Did Not Dry | Did Not Dry | — | 7 | 6 | 7 | 19 |
| Tack-Free Cure Before Testing | 1 hr, 5 min. | 1 hr, 5 min. | — | — | — | 45 min. | 45 min | 40 min. | Overnight |
| Tukon Hardness | | | | | | | | | |
| 1 day | 1.7 | 2.7 | — | — | — | 2.5 | 2.7 | 3.0 | — |
| 3 days | 4.9 | 6.3 | — | — | — | 3.9 | 4.5 | 4.9 | — |
| 5 days | 5.9 | 7.2 | — | — | — | 4.7 | 5.0 | 5.3 | — |
| 7 days | 7.7 | 8.1 | — | — | — | 5.0 | 5.8 | 6.1 | — |
| Cross Hatch Adhesion (Pass) | 100% | 100% | — | — | — | 100% | 100% | 100% | — |
| Conical Mandrel | Passed | Passed | — | — | — | Passed | Passed | Passed | — |
| Reverse Impact (Pass/Fail) | 4/8 | 8/12 | — | — | — | 0/4 | 0/4 | 0/4 | — |
| Gloss (60°) | 95.4 | 95.4 | — | — | — | 94.0 | 95.4 | 96.0 | — |

EXAMPLE 3

For weathering tests, paint compositions are prepared as in Example 2 with Sample 3, 4 and 5 alkyd resins of Example 1 and tested on various substrates by outdoor exposure (45° South) with the following results after six months:

| | Gloss | |
|---|---|---|
| Sample | Initial | Retained |
| 3 | 95.2 | 63 |
| 10[4] | 96.8 | 61 |
| 5 (conrol) | 93.8 | 39 |

All samples showed comparable excellent resistance to mildew on wood, primed or chalked, and metal substrates.

Water-spotting tests are performed on Samples 3, 4 and 5 as follows. The paint samples are sprayed on steel panels and water applied to the paint surfaces with a medicine dropper after 30 minutes up to 7 hours air dry time. The water is left on the panels for specific periods, then blotted off and the paint surface checked for spotting. The results (Table III) show that the presence of a multifunctional polyol derivative in the alkyd resin improves the stability to water spotting.

TABLE III
WATER SPOTTING RESISTANCE EVALUATION

| Air Dry Time | Hours Exposed To Water | SAMPLES 3 | 4 | 5 (CONTROL) |
|---|---|---|---|---|
| 30 Minutes | 8:00 | Definite Etch | Definite Etch | Denuded |
| 1:00 hour | 7:00 | " | " | Definite Etch |
| 1:15 | 6:45 | " | " | " |
| 1:30 | 6:30 | " | " | " |
| 1:45 | 6:15 | " | " | " |
| 2:00 | 6:00 | " | " | " |
| 2:15 | 5:45 | " | " | " |
| 2:30 | 5:30 | " | " | " |
| 2:45 | 5:15 | " | " | " |
| 3:00 | 5:00 | " | Definite Etch[1] | " |
| 5:00 | 3:00 | " | Slight Etch[2] | " |
| 7:00 | 1:00 | " | Very Slight Etch[2] | Slight Etch[2] |
| 24 hours | 4 hours[2] | Slight Etch | Very Slight Etch[2] | Slight Etch[2] |
|  | 8 hours | Definite Etch | Slight Etch[2] | Definite Etch[2] |

[1]70% Recovery after 24 hours.
[2]Complete Recovery after 24 hours.

When the foregoing examples are repeated with linseed fatty acids in place of soya fatty acids, similar results are obtained.

When the procedures of the preceding examples are repeated with the following multifunctional polyol derivatives, similar results are obtained:
1,6-hexanediol diacrylate
tetraethylene glycol diacrylate
trimethylolpropane trimethacrylate
1,6-hexanediol dimethacrylate Color determinations are carried out using a Gardner Colorimeter (Gardner Laboratory Inc., Bethesda, Md.) and viscosity determinations with a Gardner Viscosimeter (same company).

What is claimed is:

1. A water reducible alkyd resin comprising the neutralized reaction product of
   (a) an alkyd resin having an acid number of about 10 or less,
   (b) a polycarboxylic acid or anhydride having at least three free carboxyl groups for reaction, said polycarboxylic acid being present in the amount to provide an acid number of the reaction product of alkyd resin and polycarboxylic acid in the range from about 50 to about 60, and
   (c) about 0.5 to 10% by weight based on the total reaction mixture of a multifunctional polyol derivative of acrylic or methacrylic acid esters of a polyol in which at least two hydroxy groups are esterified.

2. The composition of claim 1 wherein the polyol of the multifunctional polyol derivative is pentaerythritol.

3. The composition of claim 1 wherein the polyol of the multifunctional polyol derivative is trimethylolpropane.

4. The composition of claim 1 wherein the polycarboxylic acid or anhydride is trimellitic anhydride.

5. The composition of claim 4 wherein the amount of multifunctional polyol derivative is present in the amount from about 1.0 to 4.8% by weight based on the total reaction mixture.

6. The composition of claim 4 wherein the multifunctional polyol derivative is pentaerythritol triacrylate.

7. A process for preparing a water reducible alkyd resin comprising the reaction of an alkyd resin having an acid number of about 10 or less with a sufficient amount of polycarboxylic acid or anhydride having at least three free carboxyl groups for reaction, to provide an acid number in the range from about 50 to about 60, further reacting into said reaction mixture of said alkyd resin and polycarboxylic acid or anhydride, about 0.5 to about 10% by weight based on the total reaction mixture of a multifunctional polyol derivative of acrylic or methacrylic acid esters of a polyol in which at least two hydroxy groups are esterified and neutralizing the resultant product.

8. The process of claim 7 wherein the amount of multifunctional polyol derivative is present in the amounts ranging from about 1% to 4.8% by weight of the total reaction mixture.

9. The process of claim 8 wherein the multifunctional polyol derivative is trimethylolpropane triacrylate and the polycarboxylic acid or anhydride is trimellitic anhydride and said multifunctional polyol derivative and polycarboxylic anhydride are reacted simultaneously with said alkyd resin.

* * * * *